(12) United States Patent
Noone

(10) Patent No.: US 10,536,673 B2
(45) Date of Patent: Jan. 14, 2020

(54) SMART CITY CLOSED CAMERA PHOTOCELL AND STREET LAMP DEVICE

(71) Applicant: WESTIRE TECHNOLOGY LIMITED, Belmullet, Co. Mayo (IE)

(72) Inventor: Sean Noone, Belmullet (IE)

(73) Assignee: WESTIRE TECHNOLOGY LIMITED, Belmullet (IE)

( * ) Notice: Subject to any disclaimer, the term of this patent is extended or adjusted under 35 U.S.C. 154(b) by 1 day.

(21) Appl. No.: 15/562,877

(22) PCT Filed: Mar. 30, 2016

(86) PCT No.: PCT/EP2016/056923
§ 371 (c)(1),
(2) Date: Sep. 28, 2017

(87) PCT Pub. No.: WO2016/156401
PCT Pub. Date: Oct. 6, 2016

(65) Prior Publication Data
US 2018/0115751 A1 Apr. 26, 2018

(30) Foreign Application Priority Data

Mar. 31, 2015 (GB) .................................. 1505577.5

(51) Int. Cl.
*H04N 7/18* (2006.01)
*H04N 5/33* (2006.01)
(Continued)

(52) U.S. Cl.
CPC ......... *H04N 7/188* (2013.01); *G06K 9/00288* (2013.01); *G06K 9/00348* (2013.01);
(Continued)

(58) Field of Classification Search
CPC .. G01T 1/18; G06K 9/00288; G06K 9/00348; G06K 9/00785; G06K 9/3233; G06K 9/46; G08B 13/196; G08B 13/19695; H04N 5/332; H04N 7/183; H04N 7/188; H05B 37/0218; H05B 37/0227; H05B 37/0245; Y02B 20/46; Y02B 20/48; G01S 13/58; G02B 26/004; G02B 3/14
See application file for complete search history.

(56) References Cited

U.S. PATENT DOCUMENTS 7,608,815 B2 * 10/2009 Sharma ............ H01L 31/02019
250/238
2004/0105006 A1 * 6/2004 Lazo ..................... G01S 3/7864
348/169
(Continued)

FOREIGN PATENT DOCUMENTS

WO 2013042017 A1 3/2013

OTHER PUBLICATIONS

PCT/EP2016/056923. International Search Report & Written Opinion (dated Oct. 6, 2016).

*Primary Examiner* — Anner N Holder
(74) *Attorney, Agent, or Firm* — Loza & Loza, LLP; Anthony G. Smyth

(57) ABSTRACT

The invention provides a photocell system for controlling a street lamp comprising a photocell configured to switch on and off the street light and a Closed Camera Photo Cell configured to collect image data and transmit the data to a remote location.

26 Claims, 4 Drawing Sheets

Front Vertical view of CCPC Ground Coverage

Street Pole Spacing = 30 Metre
Street Pole Height = 8 Metre

Street View Coverage of CCPC Left Side

Street View Coverage of CCPC Right Side

(51) Int. Cl.
   *H05B 37/02* (2006.01)
   *G06K 9/00* (2006.01)
   *G06K 9/32* (2006.01)
   *G06K 9/46* (2006.01)
   *G08B 13/196* (2006.01)
   *G01S 13/58* (2006.01)
   *G01T 1/18* (2006.01)
   *G02B 3/14* (2006.01)
   *G02B 26/00* (2006.01)

(52) U.S. Cl.
   CPC ....... *G06K 9/00785* (2013.01); *G06K 9/3233* (2013.01); *G06K 9/46* (2013.01); *G08B 13/19695* (2013.01); *H04N 5/332* (2013.01); *H05B 37/0218* (2013.01); *G01S 13/58* (2013.01); *G01T 1/18* (2013.01); *G02B 3/14* (2013.01); *G02B 26/004* (2013.01)

(56) References Cited

U.S. PATENT DOCUMENTS

| | | | | |
|---|---|---|---|---|
| 2004/0143602 A1* | 7/2004 | Ruiz | ........... | G08B 13/122 |
| 2006/0044789 A1 | 3/2006 | Curtis | | |
| 2006/0264175 A1* | 11/2006 | Gianchandani | ...... | H04B 5/0043 455/41.1 |
| 2007/0087756 A1* | 4/2007 | Hoffberg | ............ | G06Q 10/0631 455/450 |
| 2009/0091844 A1* | 4/2009 | Jannard | ..................... | G02B 3/14 359/689 |
| 2009/0309966 A1* | 12/2009 | Chen | ......................... | G06T 7/20 348/135 |
| 2010/0231407 A1* | 9/2010 | Carr | ..................... | G06K 19/0723 340/691.1 |
| 2012/0062123 A1* | 3/2012 | Jarrell | ................ | H05B 37/0245 315/131 |
| 2012/0136485 A1* | 5/2012 | Weber | .................... | G05B 15/02 700/275 |
| 2013/0181634 A1* | 7/2013 | Jmaev | .................... | H05B 41/38 315/250 |
| 2014/0085480 A1* | 3/2014 | Saptharishi | ............. | G06F 16/71 348/159 |
| 2014/0277900 A1* | 9/2014 | Abhyanker | ............ | G01C 21/32 701/25 |
| 2014/0320318 A1* | 10/2014 | Victor | .................... | G08G 1/142 340/932.2 |
| 2015/0185034 A1* | 7/2015 | Abhyanker | ............ | G01C 21/36 701/23 |
| 2016/0286627 A1* | 9/2016 | Chen | .................. | H05B 37/0245 |
| 2016/0286629 A1* | 9/2016 | Chen | .................. | H05B 37/0272 |

* cited by examiner

Front Vertical view of CCPC Ground Coverage

Street Pole Spacing = 30 Metre
Street Pole Height = 8 Metre

Street View Coverage
of CCPC Left Side

Street View Coverage
of CCPC Right Side

Plan of Street View Coverage of Single CCPC

Pavement 2 Metres Wide
Street 2 Metres Wide

Street Pole Spacing = 30 Metres
Street Pole Height = 8 Metres

SMART CITY CLOSED CAMERA PHOTOCELL AND STREET LAMP DEVICE

FIELD

The invention relates to a photocell device for use in street lamp applications.

BACKGROUND

In general street lamps and their associated circuits are operated by "dusk to dawn" devices known as photoelectric cells and are sometimes described as photo-electronic light controllers or photocells.

An ambient light sensor senses pre-determined levels of "dusk and dawn" light and transfers this information to nowadays electronic circuits that when incident light falling on the light sensor is below pre-set values the electronic circuit activates a switching means. The ambient light sensor is mounted within an aesthetically designed enclosure bearing in mind that its cover must transfer the ambient light to the light sensor. This enclosure is cylindrical in design so as to facilitate windage and the cover is designed to be conical so as to be self-cleaning and inhibit bird perching.

The light sensor, the electronic sensing circuit and switching means is mounted with this cylindrical enclosure and sealed so as to inhibit the ingress of water, moisture and dust. The functionality of existing photocells used in street lamps is limited to lighting applications.

In addition it is desirable for a City Municipality to monitor street lamps to ensure each lamp is operating at maximum efficiency. It is now vital that Municipalities can manage remotely their entire street lighting asset including their energy usage. On a number of occasions each year the Municipality or City Councils must carry out a visual inspection of each street light, the major problem with this exercise is there is no visual evidence only written evidence as to the street light condition. Another scouting team has to perform a similar task for the pavement and for the road or street and again only written evidence (may be the reason for road and street potholes). Other problems for Municipality or City Councils is crime or traffic accidents that occur on streets. Various remote solutions have been proposed, including mounting a camera with a photocell. For example, EP 2827578; US2011/0134239; U.S. Pat. Nos. 5,886,738 and 6,462,775 attempt to solve some of these problems, however no solution to date provides a comprehensive and effective solution for Municipality or City Councils. A further problem with monitoring and capturing data obtained from a camera is the huge amount of redundant data that is generated and needs to be transmitted over a network, with the result that additional bandwidth is required.

It is therefore an object of the invention to provide an improved street lamp with extra functionality and revenue earning capacity for municipalities.

SUMMARY

According to the invention there is provided, as set out in the appended claims, a photocell system for controlling a street lamp comprising
  a photocell configured to switch on and/or off the street lamp; and
  a Closed Camera Photo Cell (CCPC) module configured to collect image data and transmit the data to a remote location wherein the CCPC is adapted as a motion-triggered surveillance camera to capture a video or image of a scene in a region of interest, and records the scene when a human or vehicle motion is detected.

In one embodiment the system provides a monitoring module configured for monitoring energy consumption of the street lamp.

In one embodiment the monitoring module comprises a current sensor and a voltage sensor adapted to calculate RMS values.

In one embodiment the system provides a management module configured to enable remote management of the street lamp.

In one embodiment the CCPC comprises an IP-based CCTV system configured to turn images and audio into data and transmit the data over a CCTV photocell network, for example an internet connection with a dedicated IP address.

In one embodiment the Closed Camera Photo Cell (CCPC) module is configured with one or more of the following functions: Signal level processing and image enhancement, image segmentation, feature level processing, feature extraction, feature measurements and tracking, object level processing and object classification and estimation.

In one embodiment the Closed Camera Photo Cell (CCPC) module is configured to provide human gait and face recognition people and vehicle motion pattern identification from said collected image data.

In one embodiment the photocell comprises one or more communication ports.

In one embodiment the communication port supports a plurality of communication protocols comprising one or more of the following: comprises one or more of the following: 0-10 Volt or other wired interface e.g. Digital Addressable Lighting Interface (DALI®), RS-232 serial port, Ethernet IP or Wireless for switching and controlling public street lamps.

In one embodiment there is provided a broadband module to enable secure communication over a network to said remote location.

In one embodiment GPS coordinates and unit serial number readings and details can be transmitted at time of installation to a device and stored in an asset management database.

In one embodiment the CCPC module comprises a liquid lens containing water and/or oil.

In one embodiment the CCPC module is configured to record wavelengths outside of the human visible spectrum.

In one embodiment the CCPC photocell can be adapted to plug and twist-lock into said photocell system.

In one embodiment there is provided a noise sensor configured to monitor on-street noise and adapted to identify one or more different noises in use.

In one embodiment there is provided a pressure sensor adapted to measure atmospheric pressure and delivers a total atmospheric area pressure reading service to said remote location.

In one embodiment there is provided a pollution environmental sensor configured to deliver analytical and environmental pollution monitoring services to said remote location.

In one embodiment there is provided a Micro Geiger counter module configured to measure the level of radiation is in a particular area.

In one embodiment the CCPC module is configured to transmit data to one or more vehicles in the vicinity.

In one embodiment the transmit data pertains to mapping date of the environs of the street for said vehicle.

In one embodiment the CCPC module is configured to transmit data pertaining to the pavement, road and street surface to said remote location.

In one embodiment the CCPC module is configured to transmit data to a driverless vehicle to enable automatic navigation of the vehicle.

In one embodiment there is provided a radar antenna circuit configured for the detection of speed of an object, such as a vehicle.

In one embodiment the speed of the object is synchronised vehicle speed synced with a video cameras and the radar antenna is capable of seeing through certain obstacles.

The invention provides a Closed Camera Photo Cell combination included in each street light or in a plurality of street lights. Each street light has mounted on or in or underneath its canopy a Closed Camera Photo Cell. This CCPC is mounted on each street light and carries out a large number of functions, comprising one or more of the following The detection of ambient light and the use of same to switch on and switch off a street light.

Closed Circuit TV service to the public.

The monitoring of the energy used by the street light and other public services.

The delivery of street light smart grid and CMS (computer management service) thereby reading and reporting back energy, gas or water used by the general public.

Broadband cell phone and internet services to the public.

Vehicle information and sat-nay updates etc.

Environmental pollution monitoring.

Environmental noise monitoring.

Miniature precision radar monitoring.

Automatic street map updating utilising the on-board CCTV camera.

Assist driverless vehicles see around street corners.

The invention provides an innovative approach to incorporating a CCPC into a normal dusk to dawn photocell a number of on-street services, saving money, saving energy and saving on maintenance. The invention provides one or more of the following advantages:

The invention provides a continuous non-obtrusive closed circuit TV service on city streets so as to aid the police, protect the business community and keep the citizens safe including the detection of sound etc to aid anti-terrorism methods and update automatically city street maps.

Delivering vehicle speed information utilising a miniature precision radar and same applicable only to strategically positioned CCPC installations. This precision radar will operate in or close to the 60 GHz ISM band enabling the CCPC detect speed of travelling vehicles accurately. This recorded information will be synchronised with the recorded camera data and forwarded on to the storage means. This innovative radar will be a more cost effective means of detecting vehicle speed that heretofore has been proposed. It will also deliver to the CCPC the ability to see through certain obstacles.

Constantly record and report identify citizen and traffic movement and assist the city municipalities with vehicle congestion management.

Constantly monitor and report city street surface conditions and observe prevailing weather conditions.

Continuously monitor and report all environmental pollution conditions on city streets and wherever street lighting is provided.

Deliver broadband services on city streets to include wi/fi, cell phone services, sat-nav updating and driverless vehicle services.

Monitor the energy used by the street lights and report back by encompassing a computer street light management service (CMS).

Monitor the energy used by any other services adjacent or close to the street lights, electric vehicles, homes, offices, shops, general stores, industry and any present un-known electric as of today and on-street product or system or service that may be rolled out on our city streets in the future. (Note: provides street light smart grid)

Incorporating an environmental noise monitor that can be activated remotely whenever city noise needs to be recorded.

Deliver broadband Wi/Fi service etc. to the city citizens.

Deliver sat-nay and driverless vehicle information and updates.

It will be appreciated that the photocell can comprise a number of output communications ports utilizing reference output protocols is incorporated delivering: 0-10 Volt (or other wired interface e.g. DALI®, RS-232 serial port, Ethernet IP or Wireless interfaces such as WI-FI® etc. for switching and controlling public lighting smart light emitting diode (LED) or lamp ballasts or LED drivers.

The cell can also be configured with a means for GPS coordinates and unit serial number readings and details to be transmitted at time of installation via blue tooth, ISM transmission etc to a smartphone or to a handheld computer, iPad® or tablet computer once the appropriate app for Asset Management purposes is downloaded and installed. Saved SQL table format or other formats for ease of upload to any company, utility or municipality Asset Management Software.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
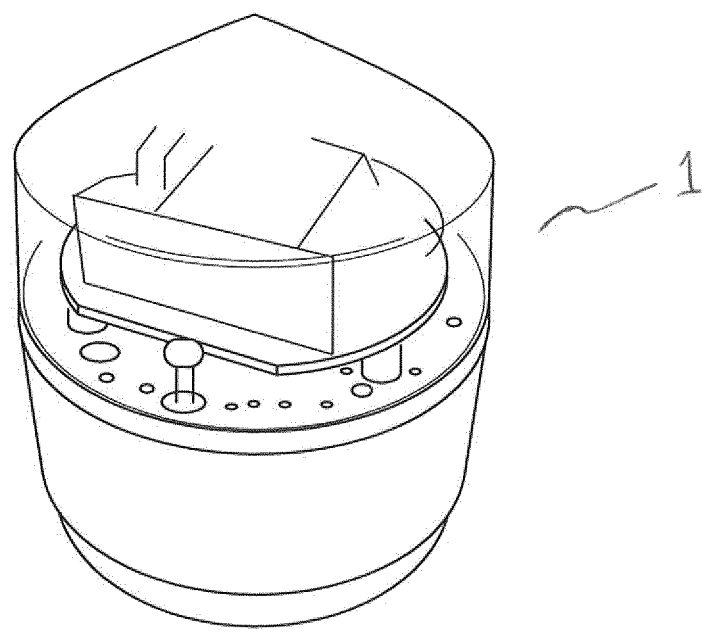
FIG. 1 illustrates a CCTV circuit enclosed in a photocell sealed housing, according to one aspect of the invention.

FIG. 1 illustrates a CCTV circuit enclosed in a photocell sealed housing, indicated generally by the reference numeral 1. The present invention can be incorporated within a sealed photocell type enclosure with at least two or more of the following circuits:

Dusk to Dawn Photocell Electronic Circuit

The normal electronic circuit delivering "on" at "dusk" and "off" at "dawn" photocell street light control actions. This circuit turns "on" the street light once the set intensity of ambient light reaches the pre-set value and turns it "off" again at "dawn" once this set pre-set "off" value is reached. This circuit comprises a power supply designed to power all the other ancillary circuits, a circuit to process the ambient light information and send a command to a switching circuit to power the street light.

Remote Street Light Energy Meter

An additional circuit is incorporated comprising a central processing unit (CPU) having means to monitor electrical energy consumption of the street light and the other incorporated CCPC circuits. Furthermore this means of monitoring the energy consumption of the lamp and associated circuits will be class 1 electrical energy meter. This combined with the "dusk to dawn" photocell allows the most accurate energy consumption possible of any connected street light, its internal circuits and modules and any apparatus connected to the street light. The electronic circuit comprises both a current sensing device and a voltage sensing means and it has the means to be a true RMS voltage and current sensor. So as to deliver smart energy meter services, the circuit further comprises a means for energy reading storage and same is held in storage until a request is received from the online computer management circuit after it has received a customer command to transfer the data.

Computerised Street Light Management Circuit (CMS) Including Smart Grid

It is now vital that Municipalities can manage remotely their entire street lighting asset including their energy usage. There is incorporated in this technology platform an electronic circuit to provide always "on" data plus the ability to send to the street light control demands so as they can maintain greater control of the street light. With the other built in above circuits this allows the Municipality control that not just allows them to monitor but also control the operation of the street light. The remote light energy meter allows the municipality to also receive and record the energy used by the street light or energy saved as they will also have the means to dim or switch "off" the street light at midnight or whenever. With this circuit combined with the other two above circuits it is also possible to monitor all other ancillary equipment connected to the street poles electric circuit.

This ancillary equipment may include advertising and display signs, festive electrical decorations, information signs, on-street pedestrian visual displays, GPS location devices for driverless vehicles, electric vehicle charging etc. This circuit comprises a means to communicate with a remote control centre referred to as a: Local Access Unit (LAU) and this LAU has the ability to receive the information from thousands of street light host units and pass the data on to the customer or clients data or cloud storage servers. Incorporated is also a means to communicate at short distances with maintenance personnel or emergency services direct to their smart phones, iPads® or laptop computers regarding diagnostic information. Also there is an incorporated modem for direct communication to local cell phone base stations should the LCU be out of commission. A comprehensive street light diagnostic circuit is employed to monitor all aspects of the street light lamp or LED driver and light engine and report back burning hours, length of time it is switched on, power consumed information and power consumed and saved during the dimming modes. A feature of this circuit is its ability to also monitor and communicate with all types of smart meters, water, gas and electricity; therefore it will be able to deploy smart grid services.

Closed Circuit TV Camera Circuit

CCTV (closed-circuit television) is a TV system in which signals are not publicly distributed but are monitored, primarily for surveillance and security purposes. CCTV relies on strategic placement of cameras and private observation of the camera's input on monitors. The system is called "closed-circuit" because the cameras, monitors and/or video recorders communicate across a proprietary coaxial cable run or wireless communication link. Access to data transmissions is limited by design.

CCTV is commonly used for a variety of purposes, including:

Maintaining perimeter security.
Monitoring traffic.
Obtaining a visual record of human activity.
Environmental observance.
Footfall data collection.

Closed-circuit television (CCTV) is the use of camera devices to transmit a signal to a specific place remote from the photocell and is positioned within the street lighting photocell enclosure. The street light "dusk to dawn" photocell is ideal for the CCTV application because it can be mounted in a perfect location right on top of the canopy of the street light luminaire with a clear view of the area of street surrounding the street light. Another feature of the CCTV is that it has its own light source for lighting up the area surrounding the street pole the street light itself.

The street light of the present invention will look the same after it is installed just another photocell mounted on top of the canopy of the street light. The Smart Closed Circuit Photocell Camera will be unseen to the public as it will be mounted where a CCTV camera is not expected to be.

CCTV System

Recently CCTV has been transformed by the shift towards internet-based products and systems, and other technological developments. CCTV software can now even identify people by how they walk. Facial recognition software is becoming better and will also be a feature of the present invention. Where you have large crowds on the street it is hard to identify people by their faces so new advance gait software can be included. A person's appearance and other features will help to tag them and share it with the other photocell CCTV cameras on the street. The photocell CCTV will also feature a sound pick up circuit so as to deliver very advanced sound tracking and record all types of environmental noise, guns been fired etc so as to aid security services and protects the citizens. A specially designed noise and gait software can be supplied as an added feature so as person and city noise identification will be available. This will be very essential for police and security personnel the will be even able to detect the different sounds of different gunfire during a crime or terrorist attack. It is envisaged that the invention will be instrumental in preventing crimes and major tragedy as there will be nowhere to hide and the sound and your gait will be on record.

In one embodiment the CCTV photocell will be an IP-based CCTV system. The CCTV photocell will turn images and audio into data then transmitting this data over the CCTV photocell network and using a local access unit straight into the Internet connection with its dedicated IP. The ultimate benefit of this CCTV photocell systems is aesthetics, invisible to the public, just another normal street light photocell that provides greater flexibility, better performance, easy to install just minutes once the cherry picker is hoisted. Nowadays due to CMS and other technologies street light lanterns are delivered equipped with a seven pin twist-lock socket mounted on the street light lantern canopy, the CCTV photocell can be adapted to plug and twist-lock into this socket by simple hand insertion, insert twist and lock and it is installed. No cables, no unsightly towers or lattice structures, poles or securing on to third party buildings. Commissioning and integration will also be fast just plug and play and immediate remote surveillance, been internet based special apps will be available for smart phones iPad's® etc. so as surveillance can take place wherever and whenever.

With the CCTV micro cameras and circuits been mounted on a circular printed circuit card, mounting of the cameras will take into account all of the required surveyed area up to 360° if required. Each micro camera utilising control software can be controlled to deliver particular surveillance observation or can concentrate on a particular angle therefore eliminating the requirement for a number of cameras as per the above Digi picture of the present CCTV system.

The CCTV Circuit

CCPC provides a Closed Camera Photo Cell combination included in each street light or in a plurality of street lights. A GPS received signal interfaces with the CCPC so as to constantly update all coordinates for rapid ease of identification of each street light either during installation and commissioning or whenever a reference location is required. Each street light has mounted on or in or underneath its canopy a Closed Camera Photo Cell. This CCPC is mounted on each street light and carries out a large number of functions as follows.

The CCTV photocell has an in-built IPv6 means of communication circuit that is an integral part of the computerized street light management circuit. The invention provides a circuit combined with the Dusk to Dawn Photocell, the CCTV, the CMS, the In-Built Energy Metering and the Environmental Noise and Gait Recognition circuits not alone reads and deliver smart energy, water and gas used data but delivers and receives in its communication means all the other circuit information and data also. Making use of this circuit to combine all the other circuit's data and information and deliver it over the internet to a remote location is one of the advantages of the invention.

The circuit may comprise a power supply and a street light switching means utilising an ambient light sensor, the power supply will be capable of delivering adequate voltage to power all aspects of the technology. The CCTV circuit will can use a number of miniature cameras to scan the area from its pivotal position mounted on the canopy of the street light. Each miniature camera will be fed into a processing circuit so as to forward on to the viewer a single scanned frame.

Different researchers and camera manufacturers offer different definitions and solutions. There does not seem to be a well-established and agreed-upon definition in either the video surveillance or machine vision industries for what is a true smart CCTV system. In the context of the present invention a smart camera can be defined as a vision system in which the primary function is to produce a high-level understanding of the imaged scene and generate application specific data to be used in an autonomous and intelligent system utilising a number of miniature cameras mounted strategically on the photocell and communications printed circuit card.

The idea of smart cameras is to convert data to knowledge by processing information where it becomes available, and transmit only results on to a monitor or store the results for later interrogation either on a private or cloud based computer server. A smart camera is 'smart' because it performs application specific information processing (ASIP), the goal of which is usually to provide better quality images for human viewing. Software developed can understand and describe what is happening in the images for the purpose of better decision-making in an automated control system. For example, the LED street light luminaire will have motion-triggered sensors for street light activation or dimming when there is vehicular or pedestrian activity. The new CCPC (Closed Camera Photo Cell) will capture video of a scene utilising the LED Luminaire motion triggering sensors detecting the motion in the region of interest, and then wakening the miniature video cameras when the motion is detected. This eliminates the need for the constant recording of motionless scenes.

By utilising smart software only motion that satisfies certain criteria will be recorded, this will be different to any other CCTV system developed heretofore. The important differences between a smart camera and "normal" cameras, such as consumer digital cameras present normal on-street CCTV cameras and camcorders, lie in two aspects. The first is in simple camera system architecture that records the motion and forward it onwards for utilisation or storage for later utilisation. This CCPC will be smart not just in utilising motion detection but also in processing using high performance microprocessors to run intelligent written and developed algorithms, in which the primary objective is to improve the images quality, combine the scanning miniature cameras in a single scene, extract information and knowledge from all the scanned images even though it is only presenting one image to the viewer. The image processing hardware in normal cameras is simpler and less powerful with the main aim being to achieve to scan and record the image and forward same onwards continuously. The CCPC as a smart camera outputs the features extracted from the scanned scene with a very high-level description of the scanned scene, which is fed into a microprocessor control system.

Figure 4:
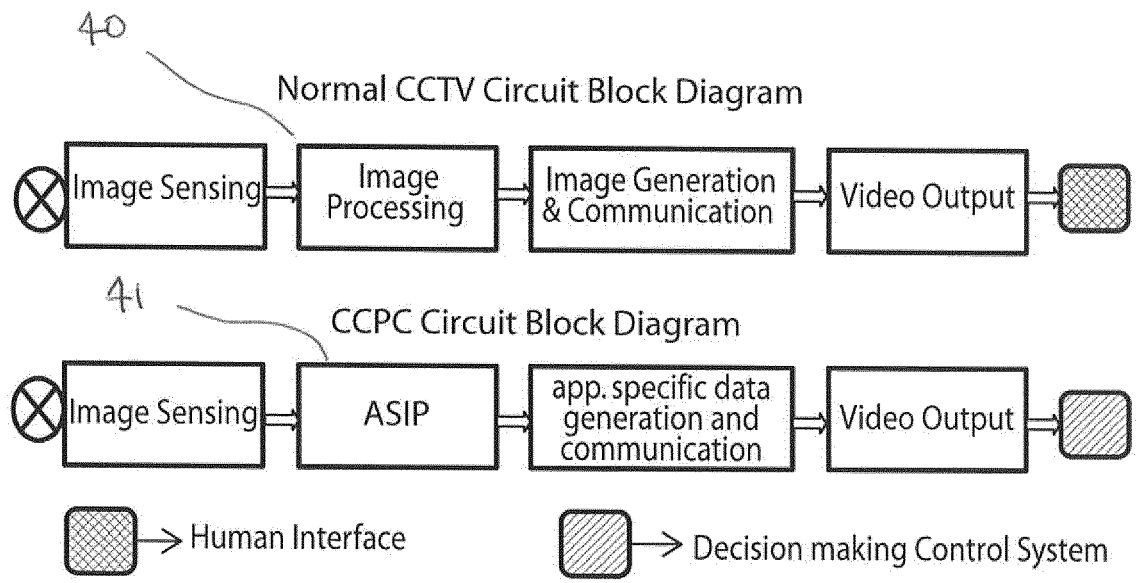
FIG. 4 illustrates the differences between a normal camera and a Smart Closed Circuit Photocell Camera with an Application Specific Information Processing (ASIP) circuit

Normal cameras the primary output is the processed version of the captured image for human observation and recording. Therefore, normal video cameras have large output bandwidth requirements (in direct proportion to the resolution of the image sensor used), while the CCPC (Closed Camera Photo Cell) of the present invention has a very low data bandwidth requirements at the output (it can be just one bit in the simplest case, with '1' meaning 'there is motion' and '0' meaning 'there is no motion'). These differences are illustrated in FIG. 4 which displays image sensing, image processing, and video to TV display or digital display for human consumption. Image sensing ASIP which is application specific data generation and communication meta data to an automated control system for decision making.

Figure 2:
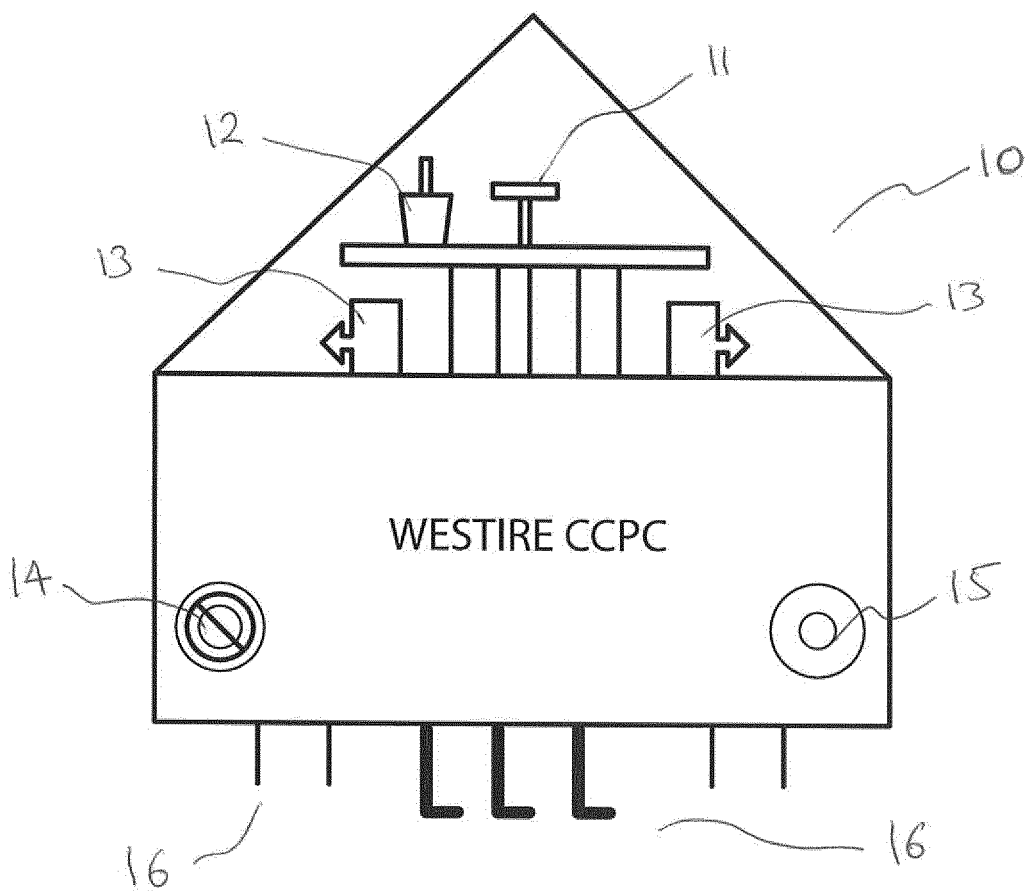
FIG. 2 illustrates a detailed view of a CCTV street light photocell and a seven Pin street lighting luminaire socket.
Figure 3A:
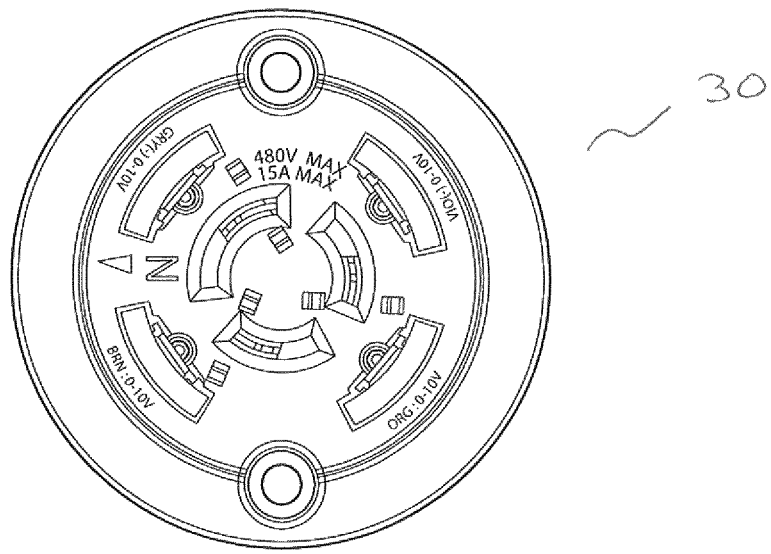
FIGS. 3a & 3b illustrates a plan view and perspective view of the street lighting luminaire socket of FIG. 2.
Figure 3B:
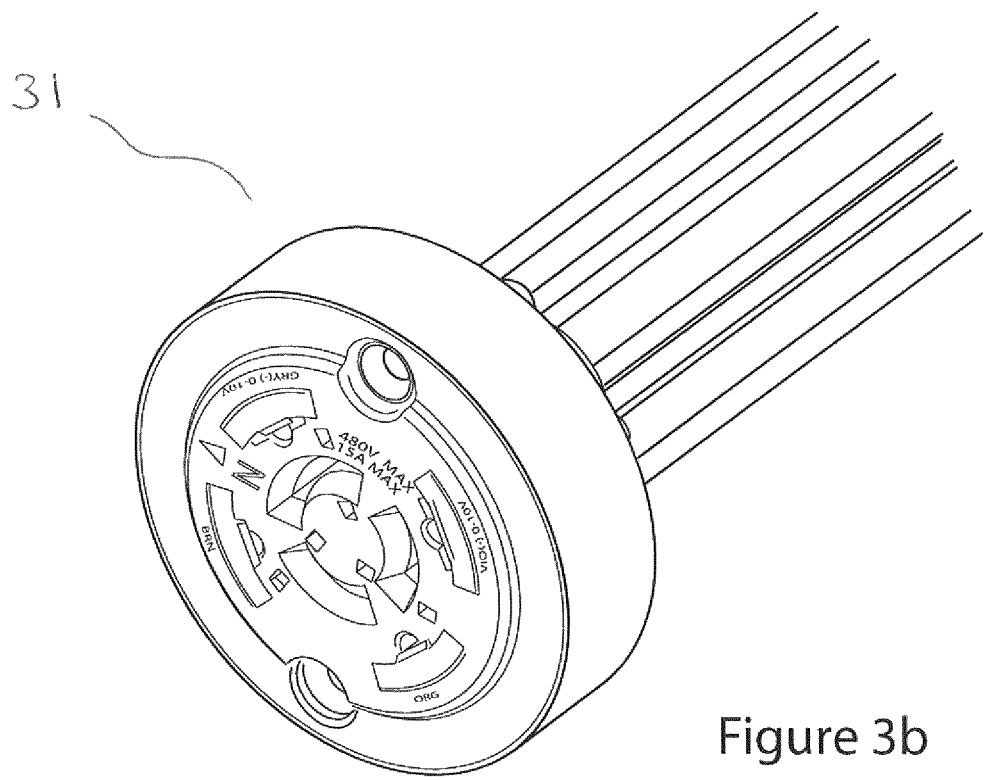

FIG. 2 illustrates a detailed view of a CCTV street light photocell and a seven Pin street lighting luminaire socket, illustrated generally by the reference numeral 10. FIGS. 3*a* & 3*b* illustrates a plan view and perspective view of the street lighting luminaire socket of FIG. 2, indicated generally by the reference numeral 30 and 31.

Referring to FIG. 1 in more detail the CCPC 10 is configured with ambient light detector 11 and a communications module 12. An integrated CCTV module 13 is provided, the operation of which is discussed in more detail below. The CCPC 10 also comprises a noise sensor 14 and an air sensor 15. A seven pin NEMA socket 16 is designed to plug into a standard street luminaire and provide connection for the CCTV module 13.

The CCPC 10 is configured with a Closed Circuit TV Photocell 13 for periodic inspection of Town/City roads, streets and pavement. Street light columns and street light luminaires have to be visually inspected regularly, the CCPC camera can be energised and it will digitally photograph the adjacent street column and luminaire as part of a photographic mesh network. Once photographed it will radio or PLC (Power Line Communications) transmit the image back to the Municipality.

Roads, pavement and streets have to be visually inspected and this type of inspection utilises vehicles and manpower, the CCPC eliminates this requirement saving money, manpower and carbon emitted from their vehicle utilisation.

Incorporated in the CCPC will be both air and noise environmental sensors, 14 and 15. The air and noise sensors 14, 15 will report back motorway, road, city or town street noise levels and air quality to the City, Municipality or relevant Government Agency all the necessary data.

A person recognition video processing chip 13 is also incorporated within the CCPC with the purpose of delivering the following service as a city street security service. A facial or person images is downloaded to the CCPC, no reaction takes place within the CCPC until it detects any of the security treat person or facial images is recognised passing by the street light day or night. Once it matched the street person or facial image to the stored image it reacts and alerts the security services with the time, date and location and any other necessary video information. In other words the system only reacts to the security treat image stored in the CCPC and only transmit the alert once the person or facial image is recorded. Total citizen privacy is guaranteed as it only records if the stored image is detected by the CCPC. Also all the necessary hardware and software is incorporated within CCPC and information can be transmitted either through the powerline or over the air to an Access Unit where it is then transmitted on to the security services when there is a security incident or treat. The same Local Access Unit can be accessed by City Municipality when observation of their city street poles pavements and streets are necessary or when they want to update digital street map services. The CCPC remains 24/7 as a normal street light photocell along with the added advantage of been activated at any time by the Town or City Municipality to digitally photograph the adjacent street light pole, the pavement and the street for its condition and maintainability in its viewing.

The system of the invention eliminates the need for CCTV monitoring city citizens day and night. All person or facial images can be stored in a micro-chip and will only activate when a threat is active on the street or pavement. At all times the CCPC can be activated to constantly record during a security or crime treat.

CCPC CCTV (Closed Circuit Photo Cell CCTV) technology mounted within an actual photocell. The system of the invention removes the present 3 pin NEMA photocell and replaces it with a 7 pin NEMA socket type CCPC which has built with it the CCTV technology. The photocell performs its normal function plus it can also deliver other services such as: street light computer management (CMS), smart grid communications with smart meters, presence detection, traffic monitoring, environmental pollution monitoring, EV and driverless vehicle control information, street, pavement and road digital photographic services and street map photographic services along with CCTV services.

It will be appreciated that at the necessary required annual designated periods each photocell can be configured to photograph a defined area of the street so as to digitally photograph that area to determine one or more of the following:

1. The condition of the street light column and luminaire.
2. The condition of the pavement surface.
3. The condition of the street or road.
4. Photograph that defined area immediately once a traffic accident or pedestrian accident occurs.
5. The Municipality digitally photograph the defined area for the provision of updated street map services. (Google Maps etc)
6. Provide over-ride digital photograph services for the police should a terrorist incident take place in the defined area.

This will be different to the CCPC as it will be a Closed Circuit Camera Photo Cell. The CCPC will not deliver CCTV services only digitally recorded pre-planned on street photographic services from a photocell mounted on top of a street light luminaire or mounted underneath a street light luminaire. It will only be used to digitally photograph each defined area when the need or requirement arises.

If there is a vehicle or pedestrian accident in the defined area valuable physical evidence is lost by the time a police or Municipal photographer photographs it and most times it will only be written evidence. Once an accident is reported the municipality activates the CCPC and digitally photographs the defined area and stores it for future proof or evidence.

Similar to the above should a terrorist incident occurs, if there is a large gathering of citizens at a particular venue then the Police have at their disposal a means to constantly digitally photograph the defined area where the venue is located for any unusual activity that could lead to an terrorist incident.

Once or twice each year the Municipality will have at its disposal a means for digitally photographing each street and road where street lights are situated and recoding and storing the digitised photographs. These images can be passed onto to the likes of Google® or FaceBook® for updating their online street or road mapping service for a fee.

The system of the invention provides a specialised instant digital photograph/image service for the Municipality or City/Town Council. This would be very different to CCTV as it would be the instant photographing of defined areas in the region of designated street lights. Later in the editing process all the defined areas can be grouped together to give the full picture if required. As this service will not be constantly video recording like CCTV does it will not cause citizen objections or citizen discomfort or impact on privacy. It is envisaged that the images can be collected/obtained at times that are not intrusive or when the weather is good and visibility is clear images can be taken, thus providing a better product to the likes of Google®.

FIG. 4 illustrates the differences between a normal camera and a Smart Closed Circuit Photocell Camera 40 with an Application Specific Information Processing (ASIP) circuit 41.

In another embodiment the CCPC is based on a similar design and concept as a miniature digital video camera inside the mouse casing controlling a computer. It operates by shining a bright light onto the surface below it and it then uses the camera to take up to 1500 pictures a second of that surface. An intelligent image processing circuit inside the mouse performs image enhancement and calculates the mouse motion based on image difference between successive frames. This difference is then used to displace the mouse cursor on the screen.

The Closed Circuit Photocell Camera is a stand-alone, self-contained photocell that integrates CCTV image sensing, utilising application specific integrated processing in the photocell circuit. The CCTV means is designed for a special type of application (for example, surveillance of the city streets, military bases, industrial campuses, airports or wherever This Smart Closed Circuit Photocell Camera will be required for surveillance.

One important aspect of the CCPC smart camera according to the invention is the intelligent application specific information processing circuit embedded in a dust to dawn photocell. The invention provide unique performance and robustness of the unique application specific image processing software used for on-street battle field performance. (ASIP), the goal of which is usually to provide the best possible quality images for human viewing and to describe what is happening in the images for the purpose of better storage and decision making automatically. The CCPC 13 can be described as a motion-triggered surveillance camera that captures video of a scene, detects motion in the region of interest, and records the scene when human or vehicle motion is detected. A major advantage is only active scenes will be captured and unless there is the described motion after midnight no scene recording will take place.

The CCPC circuit can have integrated voice/sound detection component will only take a pictures of the surrounding area when a human movement or vehicle movement is detected, or it can take a picture in a direction from which a gun-shot has been detected which will make it ideal for the security services fighting crime and terrorist attacks.

Components of the CCPC Module

The common basic components of the CCPC Module according to one embodiment of the invention include optics, solid-state image sensor (CCD or CMOS), image processor(s) and supporting hardware, output generator, and communication ports and outputs and inputs to and from the motion sensing, sound pick up and dusk to dawn circuits. The main tasks performed by the image processor(s) are to provide colour interpolation, colour correction or saturation, gamma correction, image enhancement and camera control such as white balance and exposure control. The output generator can be an NTSC/PAL encoder to provide standard TV-compatible output, or a video compression engine to provide compressed video streams or digi-photo buffers for communication over network.

This CCPC has a distinct and powerful signal processing unit to perform image feature extraction and/or pattern analysis based on application-specific requirements and it will also have output generator to produce a coded representation of the image features and/or results from the pattern matching. This will be ideal for motor vehicle number plate recognition, colours of vehicles or whatever activity that happens on the city street that can be identified by colour. The CCPC will have a very powerful signal processing technology to perform the above mentioned image feature, pattern, sound and recognition extraction base on programmed application specific criteria's.

The CCPC can deliver to a host computer a coded representation of the above mentioned image feature's, patterns, sounds and facial/vehicle distinct features for later identification. Inbuilt in this coded output will be all other required triggering signals, those signals can have coded in-bedded to alert security services police, fire or others. It will have recognition software to read car number plates, it will be able to identify the speed of the vehicles and their distinct sound patterns. The various sounds can deliver for monitoring and statistical needs the noise in decibels of the vehicle activity on the street. Should there be gunfire a coded signal will immediately alert the security services, unusual noise at night especially in the vicinity of banks etc.

Figure 5:
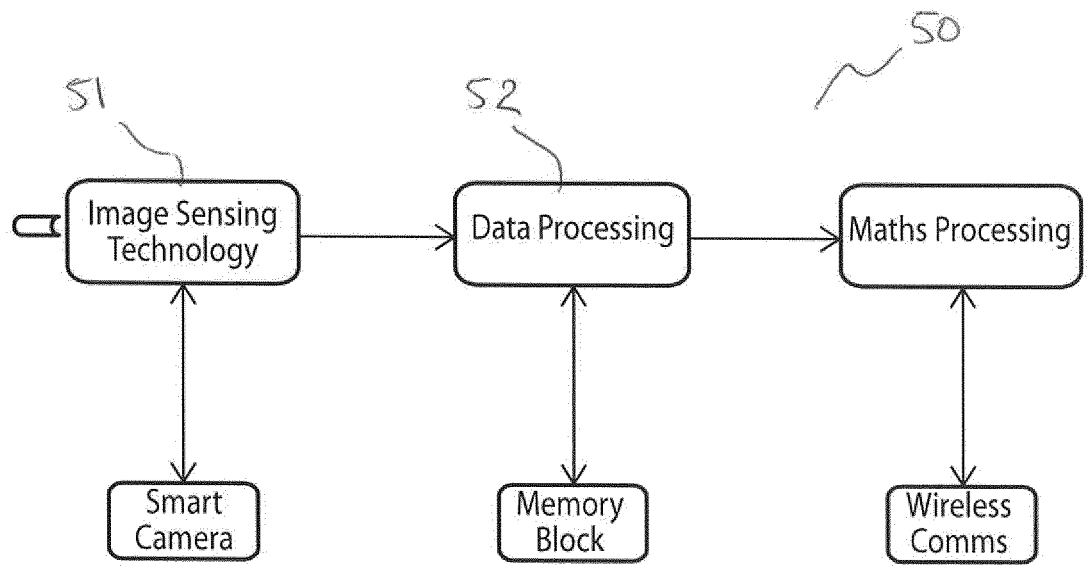
FIG. 5 shows a block diagram illustrating operation of the CCPC module.

CCPC recognition techniques will involve two types of processing, a) image enhancement and feature extraction b) and maths-intensive tasks such as statistical pattern matching. FIG. 5 shows a block diagram 50 illustrating operation of the CCPC module 13. The data-intensive tasks require high speed hardware to deal with high pixel volume and high frame rate, the maths-intensive tasks will require high performance processors to deal with issues such as pipelining and floating-point arithmetic. For the applications the CPCC photocell will have to deal with a hardware architecture will be based on a multiple-processor platform, with one or more processor(s) capable of implementing parallel processing (e.g. an FPGA—Field Programmable Gate Array) performing data intensive tasks, and a DSP and/or a RISC (Reduced Instruction Set Computer) processor performing math-intensive tasks. The CCPC module can make use of FPGA and a parallel processor Xetal working in SIMD (Single Instruction Multiple Data) mode, to perform data intensive operations such as face detection. The CCPC will have high performance DSP, TriMedia®, with a VLIW (Very Long Instruction Word) core to perform high level programs such as face recognition.

The CCPC can be a Single chip smart camera making use of CMOS image sensors so as to deliver an ASIP circuit. This image sensor chip 51 will ensure the host computer will not have a problem with the processing tasks and minimizing the data transfer between camera and computer. This will deliver a better level of signal and image processing technologies like single-chip smart cameras make it possible to design very efficient, very small as is necessary with the CCPC. It should be small, low power and be purchased at a low cost and low power at least below 1 watt. There are designs available using CMOS chips which integrates an edge detection mechanism directly into the sensor array at 30 frames/second VGA-format CMOS image sensor the CCPC will use this format with an embedded massively parallel processor to allow for real-time skin-tone detection can also be possible.

It will be appreciated that video processing is notoriously hungry for computation horsepower, memory and other resources the CCPC will have an embedded systems to store and transmit this video processing 52 so as to meet this demand of an internal embedded system. Delivering the processed video by this means will be very robust, reliable operating in the harsh conditions it will meet on the street. This will deliver the CCPC as a leading-edge, innovative embedded system for use in a street lamp.

Recently there has been a significant increase in research into FPGA for embedded vision systems and this way forward will also be considered in CCPC platform. The CCPC processing module is designed to perform image feature extraction and filtering, convolution and deconvolution methods, correction of parallax and perspective image error and image compression as the technology is now here to make this possible. A number of companies now offer adaptive lenses that can be tuned over various focal distances. Smaller, faster and more compact than traditional autofocus designs in the past. A number of disparate technologies are used to perform autofocusing that include devices based on electro-optical, electro-mechanical and acoustic-optical techniques and every effort will be made to utilise those in the CCPC design.

Water and Oil Embodiment

Varioptics® introduced recently a major breakthrough liquid lens technology that consists of a water and oil combination each of which have the same density but different refractive indices. Here the electrically conducting water solution and electrically non-conducting oil form a natural diopter due to the different indices of refraction of the two liquids. By applying an electric field, the radius of curvature of the meniscus between the two fluids changes resulting in a change in the focal length of the lens see below:

By applying an electric field, the radius of curvature of the meniscus between the two fluids changes resulting in a change in the focal length of the lens. Since the focal lengths are voltage controlled, the company's liquid lenses are supplied for use with a power supply as that incorporated in CCPC that allows the lenses to be controlled using software. This is just one of a number of tunable CCPC camera lens that could be used in the CCPC module.

Additional Features of the CCPC

Figure 6:
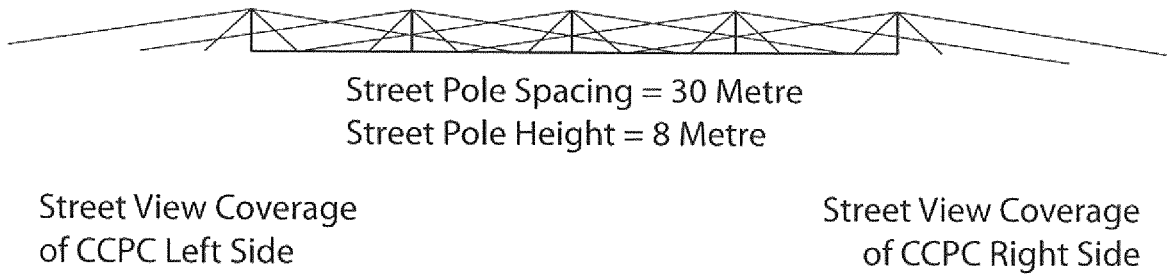
FIGS. 6 & 7 illustrates adjacent CCPC cameras with a field of view that includes its neighbour CCPC units to accurately calculate their location with respect to their neighbours.
Figure 7:
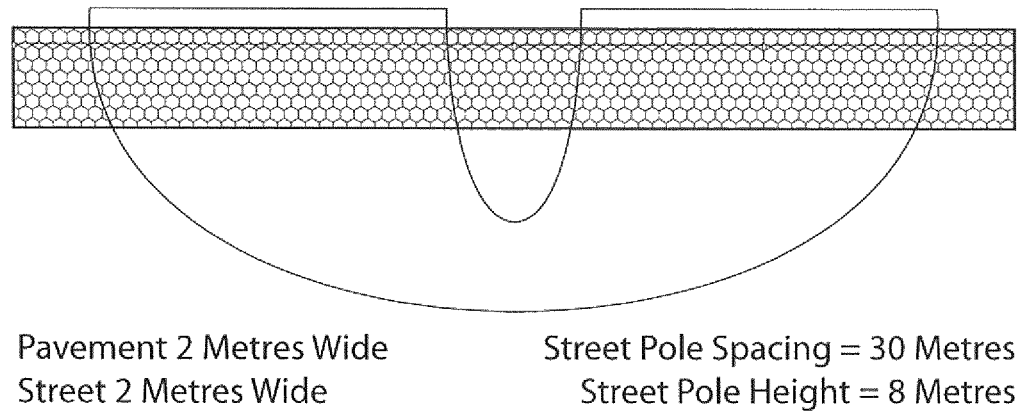

High precision reference images can be located around the outside circumference of the product. This will allow adjacent CCPC cameras with a field of view that includes its neighbour CCPC units to accurately calculate their location with respect to their neighbours, as shown in FIG. 6 and FIG. 7.

As the size of the image is known the device can calculate the distance to the image by analysing the actual size of the image recorded and comparing it with the known image size.

A further application for this feature is that where the exact location of each CCPC device is already known the camera itself can self-calibrate for wear on the optical system by correcting the image received by comparing the current image to the known or previously saved known good image. A further use is to identify when the camera lenses are becoming obscured by coating of dirt or other foreign matter. Thus enabling the CCPC unit to effectively request a maintenance visit to restore the performance of the system.

The application of the reference image to the product could be achieved by many means for example the application of a permanent label. Printing/spraying the images directly to the outside of the product or alternatively embossing the images into the actual product housing. Another option is to attach a precision cut, moulded, machined positive or negative image template to the outside of the main structural housing of the street lamp.

High precision reference images can alternatively be attached to the light fitting on which the CCPC is attached or on other street furniture.

A further feature is that the real time on all the CCPC devices in a network can if required be synchronised to better than 10 mS preferably better than 1 mS precision. When the adjacent CCPC devices are synchronised they will be set so that they capture image frames at the exact same time. Where the field of view of two adjacent cameras overlap, any objects/features captured by both cameras can be interpolated to provide a 3D or pseudo 3D image of portions of the common view. This will allow for more accurate identification of the features observed by the CCPC camera system.

Another feature of the CCPC is the ability of one or more of the cameras on the CCPC to change to recording wavelengths outside of the human visible spectrum to cover the UV and IR wavelengths.

This will allow the camera system to provide useful information when the environmental conditions for operating in the visible wavelengths are unsuitable. For example in fog, smog or if the light output of the associated streetlight fails.

A further feature is power fail mode where the CCPC has a backup battery that will allow the recording of a low frame rate video stream and save the images on local storage for up to 12 hours. This will be essential if there is a mains power failure to the CCPC. The CCPC will transmit a power fail warning when the power fails and will also transmit a power restore message once it restarts. The saved video stream can then be recovered through the network.

It is considered that if the CCPC is located in a security critical area the power supply will be restored within 12 hours, if no alternative security arrangements will be made.

As discussed previously the CCPC will be designed to provide for the monitoring of environmental pollution among other items. Because of the nature of some of the pollution types the sensors used to monitor the pollution will have a relatively short working life in the field as they will get contaminated with airborne pollutants.

As such the sensor needs to be designed so that they can be easily replaced and exchanged for maintenance purposes. It is proposed that the CCPC will have one or more docking features to allow sensors to attach to the CCPC and to be hot swapped safely with the use of a simple tool. There will be the ability to transfer power and communications through the sealed CCPC housing to the sensor units.

Depending on the power demands and the communication requirements of the individual sensor types the system of the invention provides a number of solutions to interface the CCPC with the sensor. Sealed metal contacts embedded in the housing wall of the CCPC providing safe electrical power and communication connections.

Where the sensor can run from a battery or from a Solar, Thermal or Mechanical energy harvesting power source the invention provides an optical window in the CCPC housing that will allow the sensor and the CCPC to communicate via visible, IR, or other wavelength optical communications methods.

An alternative solution is to provide power and communications by RF or magnetic fields through the CCPC housing into the sensor housing. The actual method used will depend on the requirements of the sensor.

The CCPC can make use of an (ASIP) application specific information processing software built into the CCPC. The CCPC will be able to analyse the content of the video and process and understand what is developing or happening in the vicinity of the street poles. Image processing-based pattern recognition is now a serious ingredient of artificial intelligence.

This area of video surveillance in dynamic scenes, is currently one of the most active research topics in computer vision and pattern recognition in the last number of years. Human behaviour understanding and personal identification will be a difficult design brief tasks facing IVSS for this CCPC applications.

Research has clearly indicated that behaviour understanding involves the analysis and recognition of motion patterns, and the production of high-level description of actions and interactions. Promising approaches and algorithms for behaviour understanding include dynamic time warping, finite state-machine, HMMs (Hidden Markov Models), time-delay neural networks. Personal identification is of increasing importance for many security applications. The human face and gait are now regarded as the main biometric features that can be used for personal identification in video surveillance systems. While face recognition research and development has made a lot of progress in recent years it is expected to be at a usable level by the time the CCPC is ready for commercialisation As the CCPC will separate the camera sensor and the processor circuit at the architectural level, this will keep the CCPC design simple as it makes use of the host computer as the computational machine.

Road, Pavement and street surfaces undergo wear and tear and require constant maintenance. This inspection work has to be undertaken on foot and visibly inspected and is time consuming and can be disruptive to pedestrians and vehicular traffic. Most of the time especially in large cities where pedestrian and vehicular traffic is heavy this foot inspection work is undertaken at night-time. At night-time this is costly and disruptive for the engineer's sleep patterns and costly due to nigh-time additional payments. Also the quality of the night-time inspections maybe poor and not as high a quality as visual inspections carried out during the daytime.

Already municipalities are becoming reluctant to do this night work, therefore the CCPC will deliver this service in a more effective, competitive and consistent way and at a higher level of inspection than the human eye inspection providing the street lighting is up to standard and pass it on for storage and later interrogation to the host computer frame grabbers. Not alone will it deliver this service as mentioned above but the invention can contribute to safety of the inspecting engineers. Another aspect of this inspection work been carried out by the street pole CCPC is the location and GPS coordinates of the problem can be stored for easy retrieval by the maintenance people so as to carry out the repair. The indexed image data received from all the street CCPC cameras can be easily automatically indexed and timed until a complete analysis is carried out which provides another advantage of the invention.

Mapping Embodiment

Another feature of the CCPC, according to the invention, is its ability to communicate directly with driverless cars or driver assist car smartness. As the CCPC will be located and scanning from street poles at a height above the street, e.g. 6 meters, the system will have the ability to forward advance on-street activity to smart car on-board computers. Smart cars of the future and some already on the street are equipped with 360° scanning cameras. Even-though those cameras can scan up to 100 metres they cannot see around a city or town street corner. The CCPC will provide this essential service to the smart cars and allow smart cars and driverless cars the technical feature of seeing around the corner.

Google Street View® is a technology that provides views from positions along many streets in the world. It was launched in 2007 in several cities in the United States, and has since expanded to include cities and rural areas worldwide. Streets with Street View imagery available are shown as blue lines on Google Maps®. One of the main problems with this excellent Google service is the cost and time to update it. To update this street scene service they must make use of the below type of vehicle and make use of them at time that do not upset other road and street users. A disadvantage with internet based street maps is that the scene viewed can be a number of years old. The system of the invention is configured to update google street Maps® instantly, if necessary.

The CCPC module of the present invention can be constantly viewing and scanning the streets and roads wherever street lighting is employed. As the street images will be stored for periods in the host computers Google® can then avail of this service and deliver a 24 or 48 hour updated street scene service in a simple way.

Environmental Pollution and Air Sensor

In 2006, each city within the EU was charged with the task of producing maps of the main sources of noise, i.e. from Traffic, Industries, Rail and Air. The purpose of these maps is to ascertain the population's noise exposure using a standardised index (the Lden) and then produce Action Plans to investigate ways to reduce this exposure the CCPC will have an in-built noise sensor to deliver this legislated for city noise pollution service.

A clean air supply is essential to human health and that of the environment. But since the industrial revolution, the quality of the air we breathe has deteriorated considerably as a result of human activities. The issue of air quality is still a major concern for many European citizens. It is also one of the areas in which the European Union has been most active. Since the early 1970s, the EU has been working to improve air quality by controlling emissions of harmful substances into the atmosphere, improving fuel quality, and by integrating environmental protection requirements into the transport and energy sectors. Remove the normal photocell and socket on the streetlight and replace it with the CCPC. Some 40 million people in the 115 largest cities in the European Union (EU) are exposed to air exceeding WHO air quality guideline values for at least one pollutant. Children living near roads with heavy-duty vehicle traffic have twice the risk of respiratory problems as those living near less congested streets and every road and street has a street light. This CCPC environmental monitoring functionality will be a major contributor to monitoring environmental pollution on a scale not presently contemplated.

This CCPC new environmental sensors has the ability to really change the way that data is gathered, analyzed and consumed in towns and cities. The environmental pollution sensors fitted to this CCPC will give scientists and everyone else the ability to see highly localized on the street, real-time data on things like temperature, vehicle pollutants, $CO^2$ and particulate levels in the air and even detect toxic chemical leaks should they happen. What makes this CCPC method so important is the scientists and engineers will no longer rely on the data coming from the government's environmental sensors at their monitoring scarce monitoring stations Furthermore this government's environmental pollution monitor doesn't give the whole picture like this mesh means using the CCPC sensors will. Each sensor can be fitted to each CCPC mounted on each street light so as the entire town or city can be monitored. Having specific, real-time information can inform someone with asthma on their smart phones areas to avoid on any given day or even sound an alarm automatically if there is a dangerous chemical spill. This gives scientists a better picture of where, when and why pollution is happening in each town, city, industrial or commercial zone. This will allow them take the necessary steps to make our environment better.

The CCPC Air Pressure Sensor measures atmospheric pressure, and provides those measurements to scientists, meteorologists and town and city engineers who in turn will use this air information to better understand what is going on with the weather, the town and city engineers will use this regular air data to be ready for all weather immediate changes. The CCPC will make uses of similar atmospheric sensors that are already in use but in a more innovative approach as part of the CCPC town and city mesh. Users will be alerted to any unusual data being collected so as they can decide whether they want to issue warnings or notices to the citizens. The data will also be available to the town or city citizens website where it could be used to make better weather predictions or aid in studies looking at the effect of atmospheric pressure on other environmental systems or can be downloaded direct to their smart phones.

Opting for built-in satellite navigation in a new car can be a costly affair, with makers charging as much as €2,500 for a factory-fit system. With new roads constantly being built, the sat-nay in your car could soon need updating which is a problem. The CCPC of the present invention can do this automatically using a broadband transmission module. This will allow the municipality to provide this service direct to its citizens as presently they are many down the line connections active in this service.

Another environmental feature that will be incorporated into other models of the CCPC will be a micro Geiger counter that will listen to clicks that indicate how much radiation is in a particular area. In this way the CCPC will create a new sensor network nationally in any country. Once this CCPC network is in place it will provide a means for monitoring nuclear radiation where data could be mapped nationally in any country, media, NGOs and widespread citizen scientists alike could made aware of potentially affected regions should there be a nuclear station accident. So far those present monitors are few and not located so as to form a regionally affected map of the affected area.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A closed camera photocell (CCPC) system, comprising:
   a photocell configured to switch a street lamp on or off;
   an image sensor;
   a monitoring module configured to monitor energy consumption of the street lamp; and
   one or more processors configured to:
   collect image data from the image sensor;
   collect energy data from the monitoring module; and
   transmit the image data and the energy data to a remote location,
   wherein the CCPC system is configured to operate as a motion-triggered surveillance camera that captures a video or image of a scene in a region of interest, and record the scene when human or vehicle motion is detected, and
   wherein the photocell, the image sensor, the monitoring module and the one or more processors are provided within a housing that is adapted to be mounted on the street lamp using a twist-lock plug.

2. The CCPC system of claim 1, wherein the monitoring module comprises a current sensor and a voltage sensor adapted to calculate root mean square (RMS) values.

3. The CCPC system of claim 1, further comprising:
   a management module configured to enable remote management of the street lamp.

4. The CCPC system of claim 1, wherein the CCPC system is configured to operate as an IP-based closed-circuit television (CCTV) system configured to convert captured images and audio into data that is transmitted over a CCTV photocell network.

5. The CCPC system of claim 1, wherein the one or more processors are further configured to provide signal level processing and image enhancement, image segmentation, feature level processing, feature extraction, feature measurements and tracking, object level processing or object classification and estimation.

6. The CCPC system of claim 1, wherein the one or more processors are further configured to provide human gait and face recognition of people or vehicle motion pattern identification from the image data collected from the image sensor.

7. The CCPC system of claim 1, further comprising:
   one or more communication ports, wherein the one or more communication ports support a plurality of communication protocols including a protocol used for switching and controlling public street lamps through a 0-10 Volt wired interface, a Digital Addressable Lighting Interface (DALI®), an RS-232 serial port, an Ethernet IP interface, or a Wireless interface.

8. The CCPC system of claim 1, further comprising:
   a broadband module configured to provide secure communication over a network to said remote location.

9. The CCPC system of claim 1, wherein GPS coordinates and unit serial number readings are transmitted at time of installation to an asset management database.

10. The CCPC system of claim 1, further comprising:
    a liquid lens containing water or oil.

11. The CCPC system of claim 1, wherein the image sensor is configured to record wavelengths outside of the human visible spectrum.

12. The CCPC system of claim 1, further comprising:
    a noise sensor configured to monitor on-street noise and adapted to identify one or more different noises.

13. The CCPC system of claim 1, further comprising:
    a pressure sensor adapted to measure atmospheric pressure and delivers a total atmospheric area pressure reading service to said remote location.

14. The CCPC system of claim 1, further comprising:
    a pollution environmental sensor configured to deliver analytical and environmental pollution monitoring services to said remote location.

15. The CCPC system of claim 1, further comprising:
    a Micro Geiger counter module configured to measure a level of radiation in an area.

16. The CCPC system of claim 1, wherein the one or more processors are further configured to transmit data that pertains to mapping data of the environs of the street lamp to one or more vehicles in the vicinity of the street lamp.

17. The CCPC system of claim 1, wherein the one or more processors are further configured to transmit data pertaining to a pavement, road surface or street surface proximate to said remote location.

18. The CCPC system of claim 1, wherein the one or more processors are further configured to transmit data to a driverless vehicle to enable automatic navigation of the driverless vehicle.

19. The CCPC system of claim 1, further comprising
    a radar antenna configured for the detection of speed of an object, wherein the speed of the object is synchronized with a video camera, and wherein the radar antenna is capable of seeing through certain obstacles.

20. A closed camera photocell (CCPC) system, comprising:
- a photocell configured to switch a street lamp on or off;
- an image sensor;
- a monitoring module configured to monitor energy consumption of the street lamp; and
- one or more processors configured to:
  - collect image data from the image sensor;
  - collect energy data from the monitoring module; and
  - transmit the image data and the energy data to a remote location,
- wherein the CCPC system is configured to operate as a motion-triggered surveillance camera that captures a video or image of a scene in a region of interest, and
- wherein the photocell, the image sensor, the monitoring module and the one or more processors are provided within a sealed housing that is adapted to be mounted on the street lamp.

21. The CCPC system of claim 20, wherein the image data is combined with image data generated by one or more other image sensors to obtain combined data covering a defined area.

22. The CCPC system of claim 21, wherein the combined data is provided in a stream.

23. The CCPC system of claim 21, wherein the one or more other image sensors include at least one image sensor in a different CCPC system.

24. The CCPC system of claim 20, wherein the one or more processors are configured to:
- transmit the image data to a vehicle configured for driverless operation or driver assist operation,
- wherein the image data provides the vehicle with visibility of the scene when the vehicle is located around a street corner with respect to the CCPC system and unable to directly view the scene.

25. The CCPC system of claim 20, wherein the sealed housing is installed on the street lamp through operation of a twist-lock socket provided on the street lamp.

26. The CCPC system of claim 1, wherein the one or more processors are further configured to transmit the image data to a vehicle to enable driver assist or automatic navigation of the vehicle, and wherein the image data enables the vehicle to see around a street corner.

* * * * *